United States Patent [19]

Fassbender

[11] Patent Number: 4,705,129

[45] Date of Patent: Nov. 10, 1987

[54] HYDROSTATIC STEERING ARRANGEMENT, ESPECIALLY FOR MOTOR VEHICLES

[75] Inventor: Rolf Fassbender, Mutlangen, Fed. Rep. of Germany

[73] Assignee: Zahnradfabrik Friedrichshafen, AG., Friedrichshafen, Fed. Rep. of Germany

[21] Appl. No.: 842,292

[22] Filed: Mar. 21, 1986

[30] Foreign Application Priority Data

Feb. 23, 1985 [WO] PCT Int'l. Appl. ... PCT/EP8500123

[51] Int. Cl.$^4$ .............................................. B62D 5/08
[52] U.S. Cl. ..................................... 180/132; 60/468; 91/467; 137/625.24; 251/81
[58] Field of Search ................... 180/132, 149; 60/468; 91/467; 137/625.22, 625.23, 625.24; 251/81, 283, 337

[56] References Cited

U.S. PATENT DOCUMENTS 2,917,027 12/1959 Hayse ............................. 137/625.24
3,441,115 4/1969 Gunther ........................... 251/81 X
4,462,209 7/1984 Thomsen ........................ 180/132 X Primary Examiner—John A. Pekar
Attorney, Agent, or Firm—Zalkind & Shuster

[57] ABSTRACT

Pressurized fluid from an engine driven pump is supplied to and exhausted from the opposed chambers of a hydrostatic power steering servomotor through control passages in a valve housing and in a rotatable valve body coupled through viscous liquid to a steering control shaft. A pressure signal from the pressurized chamber of the servomotor is supplied by the control passages to a valve between the pump and fluid reservoir to limit operating pressure as a function of servomotor loading.

15 Claims, 7 Drawing Figures

HYDROSTATIC STEERING ARRANGEMENT, ESPECIALLY FOR MOTOR VEHICLES

BACKGROUND OF THE INVENTION

This invention relates to a hydrostatic steering system, particularly for a motor vehicle of a type having a spring centered control element actuated by the vehicle's steering wheel for operation of a fluid servomotor in accordance with its rotational direction and rotational speed.

In hydrostatic steering systems of the foregoing type, there is no mechanical connection between the steering wheel and the vehicle wheels being steered. Generally, such hydrostatic steering systems are feasible only for slow running vehicles such as tractors, combines, loading fork stackers and the like wherein vehicle speed is limited to 50 kph. Such a steering system is disclosed, for example, in German Pat. No. 2633011, consisting of a steering control member centered by a rotational rod and in the form of axially slideable element for control of at least one servomotor by the supply and exhaust of fluid pressure generated by a manually operable pump as well as a high pressure pump driven by the vehicle engine. The fluid flow path from the high pressure pump is directed in accordance with the rotational direction imparted to the steering wheel and its rotational speed through the steering control member and the manual pump to the servomotor. The fabrication of the steering control member is very expensive because of a plurality of steering control grooves and bores therein as well as the formation of gear teeth thereon. The manual pump formed as a rotary type pump with a control disc and a propelling drive shaft, is also considerably costly because of surface finishing of its parts. Furthermore, such a steering system operates with a relatively high power loss because the high pressure pump usually delivers pressurized fluid at an unnecessarily high rate of flow with the entire pressurize fluid being returned to the reservoir tank even in the neutral position of the steering control system through the steering control member.

It is therefore an object of the present invention to provide a hydrostatic steering system of relatively simply construction and capable of being fabricated at a reasonable cost with a capability of generating high steering forces in response to relatively low energy input. A further object is to provide a steering control system capable of meeting present day requirements in the utilization of the high pressure pump associated therewith by virtue of its functional interrelationship with the operating pressurized fluid system.

SUMMARY OF THE INVENTION

In accordance with the present invention, the steering control member is in the form of a rotary valve element centered by means of a return spring arrangement and journaled directly in a valve housing. The rotary valve element is formed with two flow control bores which extend diametrically therethrough and intersect for the purpose of circulating pressurized fluid from the pump to and from the servomotor. Also, recesses are formed in the rotary valve element to exhaust fluid from the servomotor. In the neutral position of the rotary valve member, flow through the intersecting control bores are blocked in positions symmetrically spaced from a flow passage in the housing connected to the fluid reservoir tank. The steering control member is operatively connected to the rotary valve element by means of a visc coupling within a visc liquid chamber separated from the pressured fluid in the valve passages by seals engaging the external cylindrical surface of the rotary valve element. Return flow of pressurized fluid from the servomotor is restricted under control of the pump pressure regulated in accordance with servomotor load. In the neutral position of the steering control valve, a small leakage flow of fluid is conducted through one of the aforementioned recesses in the periphery of the rotary control valve element to the fluid reservoir tank for the purpose of maintaining the rotary valve element lubricated.

According to an important feature of the invention, the steering control valve in the form of a rotary element, is directly journaled in the valve housing and is adjustably centered in its neutral position by means of a readjustable spring arrangement. The arrangement of diametrically extending, intersecting bores in the rotary valve element and the recesses formed therein between such bores, cooperate with valve passages in the valve housing for the control of pressurized fluid flow in such a manner as to provide a valve assembly of minimal manufacturing cost for the purpose of regulating and distributing pressurized fluid.

BRIEF DESCRIPTION OF THE DRAWING FIGURES

A preferred embodiment of the invention is shown in FIG. 5.

Further advantages and features of the invention will become apparent from the embodiments disclosed herein after by way of example and described on the basis of the accompanying drawings, in which:

FIG. 6 is a partial fluid circuit diagram illustrating another modification of the fluid control circuit; and FIG. 7 is a partial fluid circuit diagram illustrating yet another embodiment of the fluid control circuit.

DETAILED DESCRIPTION OF THE EMBODIMENTS

Figure 1:
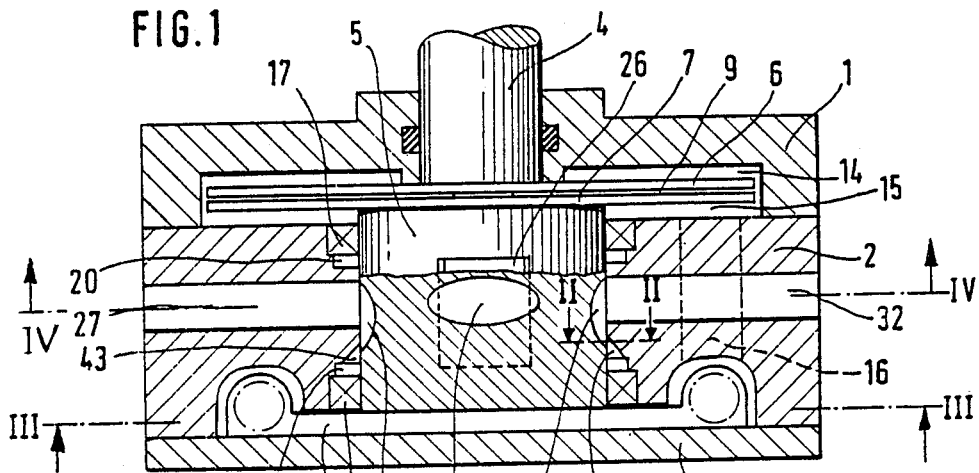
FIG. 1 is a simplified section view through the rotary valve element of the present invention disposed in a neutral position.
Figure 3:
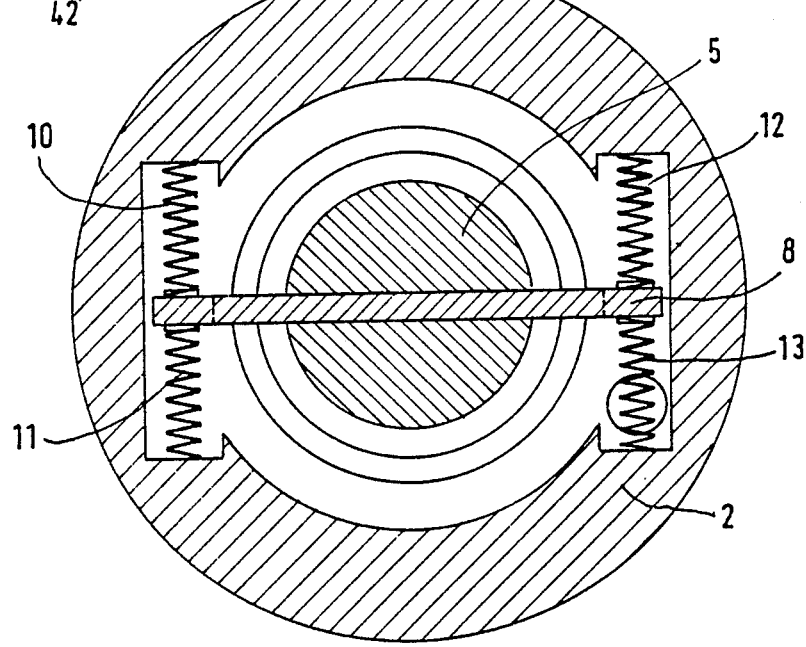
FIG. 3 is a section view taken substantially through a line indicated by section III—III in FIG. 1.

The construction of the steering control assembly illustrated in FIG. 1 includes an enclosing flange 1, a valve housing 2 and a cover 3 which are firmly fastened to each other by screws or the like. Within such assembly, a steering control shaft connected with a steering wheel (not shown) is mounted. A rotary valve element 5 of generally cylindrical shape, is fitted into the valve housing 2. A clutch disc 6 is torsionally connected to the shaft 4 and a clutch disc 7 is secured to the rotary valve element 5. The space enclosing the clutch discs 6 and 7 is filled with a highly viscous liquid 9. Such space includes the operating gap formed between the clutch discs. The clutch discs may therefore be rotated relative to each other. The rotary valve element 5 is resiliently centered in its neutral position in the housing 2. Such centering is achieved by means of an arrangement which consists of a bar extending transversely within the housing through the valve element as shown in FIG. 3 in engagement with springs 10, 11, 12 and 13.

In response to rotation of the shaft 4, the highly viscus liquid 9 transmits torque between the two clutch discs for transmittal to rotary valve element 5. Such torque transfer operation corresponds to that of well known viscus clutch devices as utilized, for example, in axle differentials. The torque transmitted through the viscous liquid will depend on the rotary direction of the shaft 4 or steering wheel and the relative speeds of the two clutch discs 6 and 7 with an increasing speed of the shaft 4. The torque transmitted may be influenced by the viscosity of the viscous liquid as well as the size and number of clutch discs utilized. Since the torque transferred through the viscous clutch to the rotary valve element 5 is resisted by the centering springs 10-13 in the housing 2, the rotary valve element will be rotated in accordance with the rotary direction and speed of the shaft 4 relative to the valve housing 2. In order to maintain fluid friction between the clutch disc 6 and the stationary flange or between the clutch disc 7 and the stationary housing 2 at a minimum, recesses 14 or 15 are provided therein. The space occupied by the viscous clutch assembly is in communication with the space enclosing the return spring arrangement 8, 10-13 by means of a bore 16 shown by dotted lines in FIG. 1. The rotary valve element 5 is thereby pressure compensated so as to avoid use of a special axial bearing.

The viscous clutch assembly hereinbefore described as the advantage that it is capable of converting large rotary displacement of the steering wheel into small rotary control movements of the rotary valve element dependent on steering speed. The viscous clutch assembly furthermore has a dampening function in isolating the steering wheel from pressure pulsation disturbances.

Figure 4:
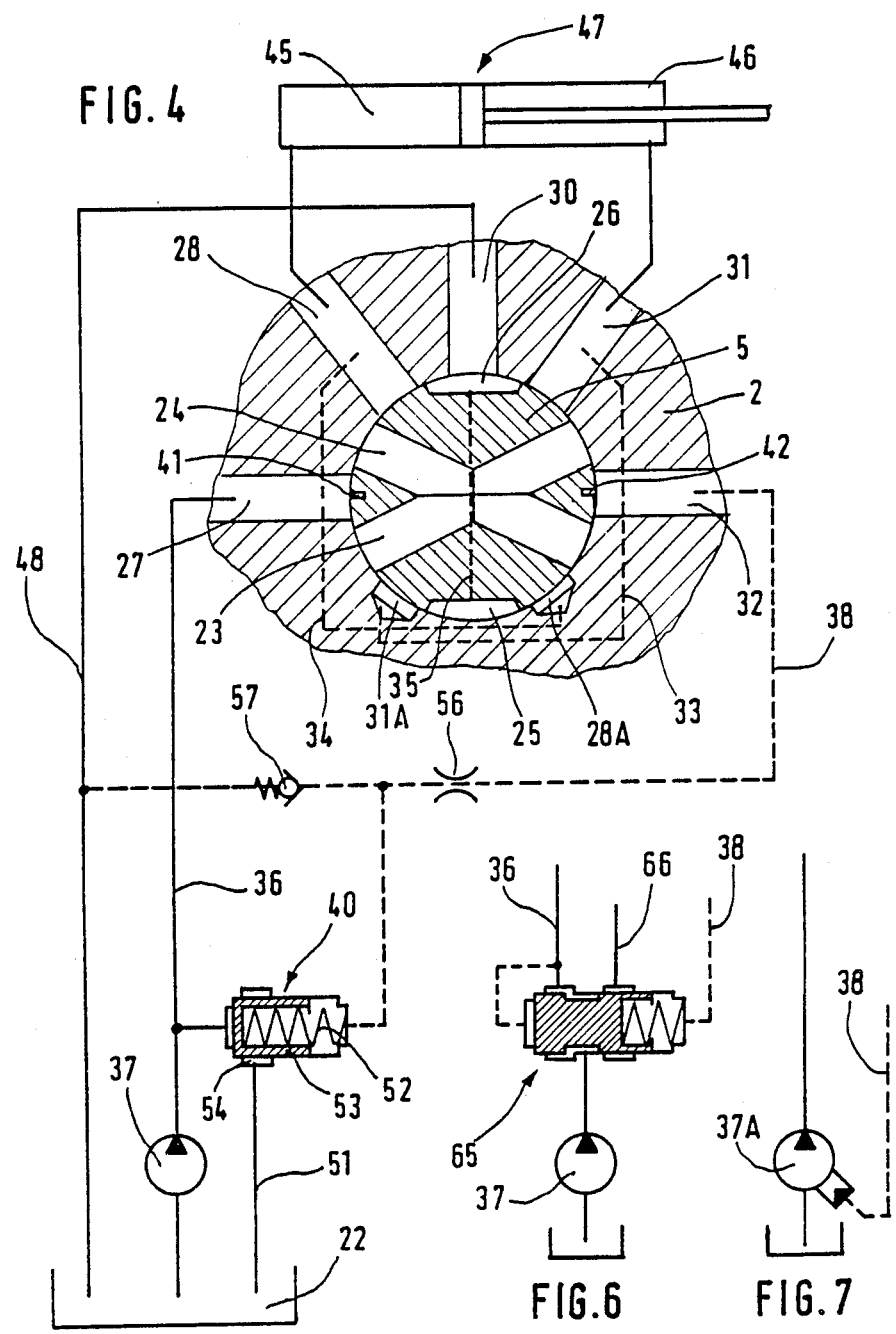
FIG. 4 is a partial section view taken through a line indicated by section IV—IV in FIG. 1 in association with a fluid circuit diagram.

Pressurized fluid control is effected at the peripheral portion of the rotary valve element 5. Seals 17 and 18 separate the pressurized fluid thereat from the fluid of the viscous coupling assembly. Chambers 20 and 21 are disposed adjacent to the axially spaced seals 17 and 18 and are pressure vented to an oil reservoir tank 22 as shown in FIG. 4.

Further details of the valve assembly 2, 5 are described with reference to FIG. 4. The rotary valve element 5 has two intersecting control bores 23 and 24 extending diametrically therethrough and two peripheral recesses 25 and 26. The control bores 23, 24 and recesses 25, 26 cooperate with radially extending flow passages 27, 28, 30, 31 and 32 in the valve housing 2. The control bores in the rotary valve element 5 and the flow passages in the valve housing 2 are so disposed that the rotary valve element 5 is pressure compensated in a radial direction except for control pressures. Pressure compensation is provided by a blind hole 28 formed in the housing 2 and connected by passage 34 to the radial control passage 28 in the housing. Similarly, a passage 33 interconnects blind hole 31a wih the radially extending control passage 31 in the housing. An additional passage 35 shown by a dotted line interconnects the peripheral recess 25 with the recess 26 for pressure compensation within the rotary valve element. Pressure compensation is thereby achieved for the valve assembly 2, 5 by a relatively simple fabrication method.

The radial control passage 27 in the housing 2 is connected by means of a pressure conduit 36 to a high pressure pump 37 to which fluid is supplied from the reservoir 22. A radial control passage 32 on the other hand, is connected by flow conduit 38 to a valve 40 for purposes to be explained hereinafter. The pump 37 is driven by the vehicle engine at a variable speed.

Figure 2:
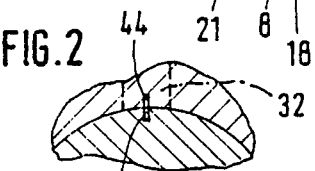
FIG. 2 is a partial section view taken substantially through a plane indicated by section II—II in FIG. 1.

In the neutral position of the rotary valve element 5 as shown, the control bore 23 and housing passage 32, are connected through grooves 41 and 42 and passages 43 and 44 as shown in FIG. 1 to the annular chamber 21 to which the reservoir 22 is connected. The grooves 41, 43 or 42, 44 are very narrow as seen in FIG. 2 so that the fluid connection between the control bores 27 and 32 and the reservoir 22 is interrupted in response to small adjusting movements of the rotary valve element through the housing 2. The flow passages 28 and 31 in the housing are connected to pressure chambers 45 and 46 of a servomotor 47 to which the wheels of the vehicle are operatively connected. The flow passage 30 in the housing is connected by a return conduit 48 with the reservoir 22. The flow passage 30 is in fluid communication with the recess 26 and all operational positions of the rotary valve element 5. In FIG. 1, the axial extent of the recesses 25 and 26 are shown to reach the annular chambers 20 and 21. Accordingly, the chambers 20 and 21 and the recesses 25 and 26 are continuously in fluid communication with the reservoir 22.

The valve 40 aforementioned, is installed between the pressure line 36 from the pump 37 and a connecting line 51 to the reservoir 22. A piston 53 is disposed within the housing of the valve 40 and is loaded by a spring 52. In the position of valve 5 as shown in FIG. 4, corresponding to an inactive steering wheel, the flow passage 27 in the housing is blocked except for leakage flow of fluid through groove 41, passage 43 and chamber 21 to the reservoir 22. Such leakage flow of fluid serves to lubricate the rotary valve element in order to avoid jamming as a result of heat expansion. If large temperature changes in the circulating pressure fluid do not occur during nonuse of the steering control valve, because of additional fluid consuming devices, for example, the groove 43 as shown in FIG. 1 may be omitted. In such case, no fluid communication will be provided between the housing control passage 27 and the reservoir 22 through chamber 21 and no flow of fluid at all to the reservoir occurs in the neutral position of the rotary valve element.

With continued reference to FIG. 4, the control passage 32 in the housing is also in fluid communication with the reservoir 22 through the groove 42, the passage 44 and the chamber 21 for balance purposes. As a result, the control line 38 is depressurized. The piston 53 of the valve 40 will therefore be acted upon by the pressure prevailing in line 36 to displace the piston 53 against the bias of spring 52. Fluid communication will thereby be established between the pressure line 36 and line 51 through annular groove 54. Thus, when the steering wheel is in nonuse, the flow of fluid from pump 37 may return to the reservoir 22 with virtually no pressurization.

In the neutral position of the rotary valve element 5, the control passages to the servomotor 47 are blocked to establish hydraulic locking of the servomotor. When the rotary valve element 5 is angularly displaced in relation to the valve housing 2 in a clockwise direction, fluid communication is established between the control bore passage 23 and the control passage 27 in the housing which the pressure line 36 is connected. At the same time, fluid communication is established between the control bore passage 24 and the control passage 28 as well as to establish fluid communication between the passages 30 and 31 through recess 26. Also, the leakage flow communication from the control passage 32 through groove 42 and passage 44 as well as fluid communication from control passage 27 through groove 41 and passage 43 to the reservoir 22 is interrupted.

When passages 27 and 32 of the housing 2 are in fluid communication with each other through control bore 23 and the rotary valve element 5, pressure compensation between the pressure line 36 and the control line 38 is established by means of valve 40. The piston of valve 40 is then shifted in a passage blocking direction as a result of the bias of spring 52. Such closing movement of the piston 53 is overruled only when the flow of fluid between passage 27 and bore 23 is so great that the pressure differential produced corresponds to the force of spring 52 divided by the cross-sectional surface area of the piston 53. In such case, the pressure differential will also be communicated to control line 38 through passage 32. When the spring 52 has a small spring constant, the force of spring 52 divided by the cross-sectional area of the piston 53 is virtually independent of the position of the piston and the magnitude of the fluid pressure of the fluid at the intersection of passage 27 and bore 23 will depend essentially on the cross-sectional area of such passage intersection. The cross-sectional area of such passage intersection increases as the rotary valve element 5 is further displaced relative to the housing 2 so that the flow of fluid increases from the passage 27 to the control bore 23.

The pressurized fluid conducted through control passage 27 in the valve housing is supplied to the pressure chamber 45 of the servomotor 47 through control bores 23 and 24 in the valve rotary element 5 and control passage 28 in the valve housing in order to effect displacement of the piston in a right hand direction as viewed in FIG. 4. Fluid thereby displaced from the opposed pressure chamber 46 of the servomotor is conducted through control passage 31 in the valve housing, the recess 26 in the valve rotor 5, the control passage 30 in the valve housing and return line 48 to the reservoir 22 with the valve rotor 5 being displaced from the neutral position in a clockwise position. When the valve rotor 5 is displaced from its neutral position counterclockwise, then a pressure differential is developed to control valve 40. Fluid then flows through control bores 24 and 23 in the valve rotor and control passage 31 in the valve housing to the pressure chamber 46 causing the servomotor 47 to move in a left hand direction. Fluid is then displaced from the pressure chamber 45 into control passage 28, through recess 26, control passage 30 and return line 48 to the reservoir 42.

The control passages 28 and 31 to the servomotor 47 are arranged in the valve housing 2 as shown in FIG. 4 in an advantageous manner symmetrically with respect to the control passage 30. A similar symmetrical arrangement may be provided with respect to the control passage 27. The arrangement shown in FIG. 4 is of advantageous import in that fluid returning from the servomotor 4 flows in both directions through the same recess 26. Fluid communication may be established between recesses 25 and 26 as shown by dotted line 35 of a small dimension for conducting fluid flow at a leakage rate for compensation purposes.

In order to effectively limit pressure of the fluid in the pressure supply line 36, control line 38 is interconnected with the exhaust flow return line 48 through a pressure limiting check valve 57 and a flow restrictor 56. When the pressure of the fluid in control line 38 increases to a point opening the pressure limiting valve 57, piston 53 of the valve 40 opens the annular groove 54 thereof as a result of the pressure differential across the flow restrictor 56. The pressure limiting valve 57 thereby operates as a precontrol valve for the valve 40.

Figure 5:
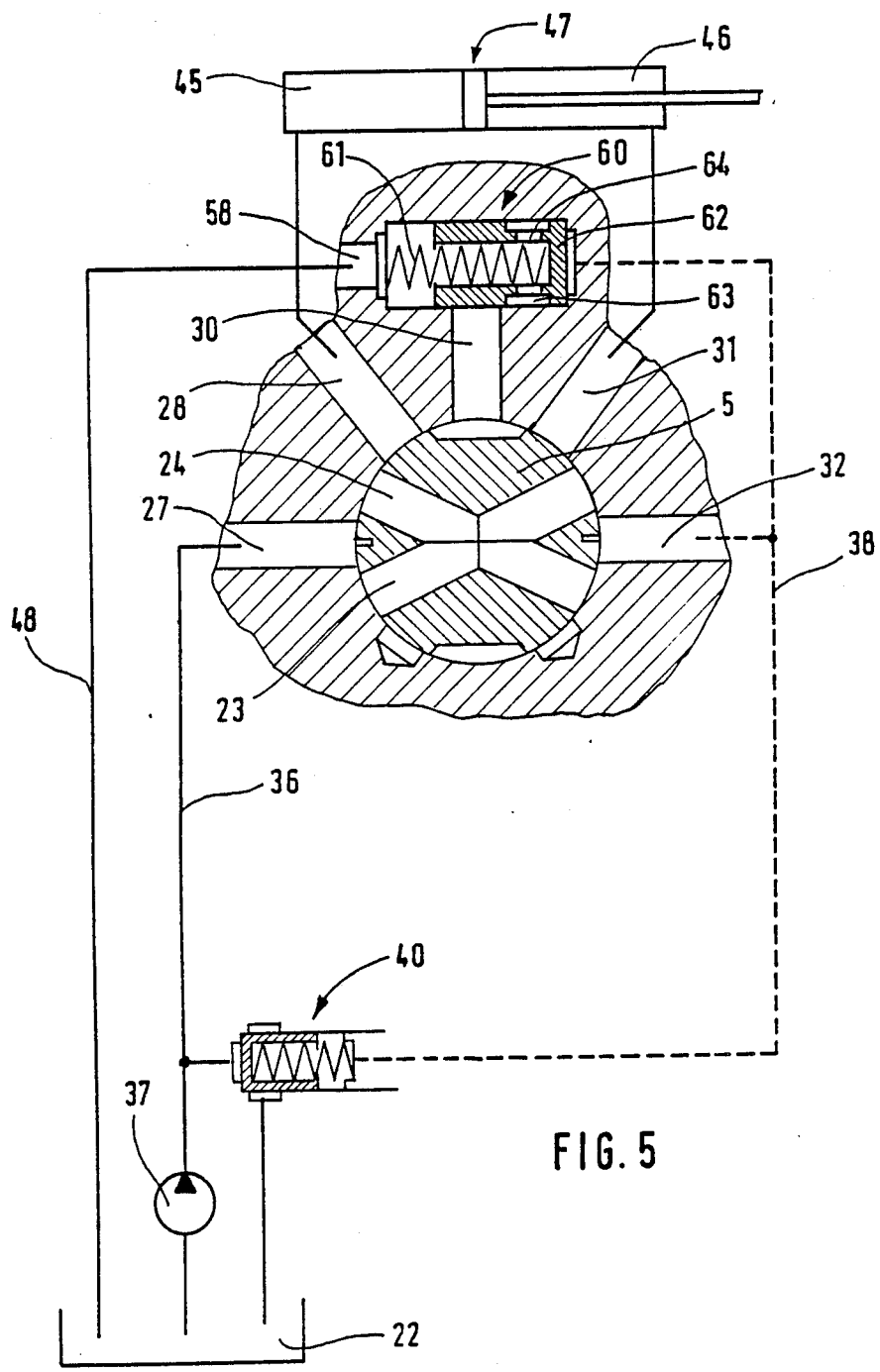
FIG. 5 is a partial section view similar to that of FIG. 4 with a modified fluid control circuit.

The foregoing steering control system may not be effective to cope with various conditions which would cause malfunction. For example, whenever the steering wheel is actuated in one direction corresponding to rotation of the valve rotor 5 in a clockwise direction, and at the same time an external force on the wheels of the vehicle tend to cause displacement of the sevomotor 47 in a right hand direction, the servomotor piston may be displaced under the force of the external wheel turning forces more rapidly than that effected by rotation of the vehicle steering wheel through the steering control system. In such case, adjustment in displacement rate of the servomotor piston does not depend on the flow restricting effect of the control passages 27, 23 and 24 of the valve assembly. As a result of the external wheel turning force causing fluid to be displaced from the pressure chamber 46 through control passage 31, recess 26 and control passage 30 more rapidly to reservoir 22 than that effected by the steering control system, a cavitation condition will develop in the pressure chamber 45. Such condition may be avoided by use of an arrangement as illustrated in FIG. 5. The fluid in the control passage 30 displaced from the pressure chamber 45 of the servomotor 47, is conducted to the return flow line 48 through a return passage 58 extending from a locking valve 60. The locking valve includes a piston 62 loaded by a spring 61. A pressure face of the piston opposed by the spring 61 is acted upon by the pressure of the fluid in line 38 while the opposing spring surface of the piston is in fluid communication with the reservoir 22. Fluid communication between the control passage 30 and the return passage 58 may thereby be established through the annular groove 63 under control of the valve piston 62 and a transverse bore 64 therein.

As a result of the external wheel turning force loading of the servomotor piston as herein above described, producing a cavitation condition within the pressure chamber 45, a sharp drop in pressure occurs within the control passages 28, 24 and 23 of the valve assembly. Such pressure drop also effects the pressure of the fluid in control line 38 through the control passage 32. The valve piston 62 of valve 60 will thereby be displaced by the force of spring 61 to its locking position as shown in FIG. 5 in which fluid flow to the reservoir is blocked. The valve piston 62 always assumes such locking position whenever the servomotor piston is displaced at a rate greater than that correspnding to its displacement by pressurized fluid conducted thereto through the control passage 27. The pressure of the fluid in the control line 38 will then be equal or less than the pressure in the return line 48 so that the spring 61 will maintain the piston 62 displaced to its right hand position as shown.

On the other hand, the valve piston 62 will be displaced to its left hand position against the bias of spring 61 whenever the pressure in control line 38 as well as the pressure in the active control passages conducting inflow of fluid to the servomotor are greater than the quotient of the spring force divided by the cross-sectional area of the piston 62. In such case, the pressurized fluid will be conducted from the control passage 30 through the annular groove 63 and transverse bore 64 of the valve 60 to the return line 48. The locking valve 60 thereby prevents the servomotor 47 from being displaced in advance of displacement imparted thereto by the rotary movement of the vehicle steering wheel, and has such effect in both steering directions.

Where the steering control system as hereinbefore described is to supply additional fluid consuming devices with pressurized fluid from the pump 37, as for example a hydraulic lifting apparatus, then the valve 40 as hereinbefore described is replaced by a flow dividing valve 65 as shown in FIG. 6. Any flow of fluid not required for the steering control system, is then conducted to the other fluid consuming device through line 66 rather than being returned to the reservoir 22.

In accordance with another modification as shown in FIG. 7, the control line 38 may be connected to a flow rate adjusting device of a variable displacement type pump 37. The variable displacement pump 37a according to this modification, will only supply fluid to meet the requirements of the steering control system.

The hydrostatic steering system as hereinbefore described generates the force necessary for steering operation exclusively from an energy supply such as the engine driven pump to the exclusion of any other force generating source. The muscular force of the driver merely serves to angularly displace the valve rotor. In view of such characteristics of the described steering control system, the vehicle is not capable of being maneuvered in the event of any disturbances of the steering control system. Accordingly, the steering control system of the present invention are to be utilized predominantly for slow moving machines with a maximum speed of 30 kph.

I claim:

1. In a hydrostatic steering system for automotive vehicles or the like, having a steering control member, a pump, a fluid reservoir and a servomotor with opposed pressure chambers, the improvement comprising a rotatable valve body (5) drivingly connected to the steering control member, a valve housing (2) directly journaling the valve body, centering means (8, 10-13) operatively connected to the valve body for yieldably resisting angular displacement thereof from a neutral position, a pair of intersecting connecting passages (23, 24) extending diametrically through the valve body, a pair of peripheral recesses (25, 26) formed in the valve body in spaced relation to said connecting passages and a plurality of distributor passages (27, 28, 30, 31, 32) formed in the housing extending from the valve body in the neutral position between the connecting passages and in spaced relation to the recesses to the pump, the reservoir and the pressure chambers of the servomotor, respectively.

2. The improvement as defined in claim 1 wherein said distributor passages extend from the valve body in angularly spaced relation thereto within a substantially 180° arc.

3. The improvement as defined in claim 1, wherein two of the distributor passages (28, 31) are positioned in the housing in symmetrical relation to one of the connecting passages (30) conducting exhaust flow to the reservoir.

4. In a hydrostatic steering system for automotive vehicles or the like, having a steering control member, a pump, a fluid reservoir and a servomotor with opposed presure chambers, the improvement comprising a valve body (5) drivingly connected the the steering control member, a valve housing (2) rotatably mounting the valve body, centering means (8, 10-13) operatively connected to the valve body for yieldably resisting angular displacement thereof from a neutral position, control passage means (27, 28, 30, 31, 23, 24) extending through the valve body and the housing for conducting pressurized fluid from the pump to and from the servomotor, recess means (25, 26) formed in the valve body for directing exhaust flow of the fluid through the control passage means from the servomotor to the reservoir, and clutch means (6, 7, 9) operatively coupling the steering control member and the valve body for establishing said driving connection there between.

5. The improvement as defined in claim 4, wherein said clutch means includes a body of viscous coupling liquid (9) between the steering control member and the valve body and axially spaced seal means (17, 18) mounted on the valve body for separating the fluid from the viscous coupling liquid.

6. In a hydrostatic steering system for automotive vehicles or the like, having a steering control member, a pump, a fluid reservoir and a servomotor with opposed pressure chambers, the improvement comprising a valve body (5) drivingly connected the the steering control member, a valve housing (2) rotatably mounting the valve body, centering means (8, 10-13) operatively connected to the valve body for yieldably resisting angular displacement thereof from a neutral position, control passage means (27, 28, 30, 31, 23, 24) extending through the valve body and the housing for conducting pressurized fluid from the pump to and from the servomotor, recess means (25, 26) formed in the valve body for directing exhaust flow of the fluid through the control passage means from the servomotor to the reservoir, and restricted groove means (41) in the valve body for conducting lubricating flow of the fluid under pump supply pressure in the neutral position of the valve body to the reservoir.

7. The improvement as defined in claim 6, including locking valve means (60) operatively connected between the exhaust passage means (30) and the reservoir (22) for throttling exhaust flow of the fluid to the reservoir in dependence on the supply pressure of the fluid in the restricted groove means (41).

8. In a hydrostatic steering system for automotive vehicles or the like, having a steering control member, a pump, a fluid reservoir and a servomotor with opposed pressure chambers, the improvement comprising a valve body (5) drivingly connected to the steering control member, a valve housing (2) rotatably mounting the valve body, centering means (8,10-13) operatively connected to the valve body for yieldably resisting angular displacement thereof from a neutral position, control passage means (27,28,30,31,23,24,25,26) extending through the housing and the valve body between the pump and the servomotor for pressurization of one of the opposed chambers (45 or 46) thereof, load controlling valve means (40) operatively interconnected between the pump and the reservoir for regulating said pressurization of said one of the chambers and load signal means (38) connecting said one of the chambers through the control passage means to said valve means for limiting said pressurization as a function of servomotor loading.

9. The improvement as defined in claim 8, including recess means (25, 26) formed in the valve body for directing exhaust flow of the fluid through the control passage means from the servomotor to the reservoir.

10. The improvement as defined in claim 9, wherein the control passage means includes distributor passages (28, 31) formed in the housing in fluid communication with the servomotor, a supply passage (27) formed in the housing in fluid communication with the pump, intersecting conduit means (23, 24) extending through the valve body for controllably restricting and distributing flow of the pressurized fluid through said passages (27, 28, 31) to the servomotor (47) and exhaust passage means (30) formed in the housing for conducting fluid through the recess means from the servomotor to the reservoir.

11. The improvement as defined in claim 10 including restricted groove means (41) in the valve body for conducting lubricating flow of the fluid under pump supply pressure in the neutral position of the valve body to the reservoir.

12. The improvement as defined in claim 10, including locking valve means (60) operatively connected between the exhaust passage means (30) and the reservoir (22) for throttling exhaust flow of the fluid to the reservoir in dependence on the supply pressure of the fluid in the restricted groove means (41).

13. The improvement as defined in claim 12, including an additional pump loading conduit (66) and flow dividing valve means (65) connected to the pump and said load signal means (38) for controlling supply of the fluid to the additional pump loading conduit in dependence on the loading of the servomotor.

14. The improvement as defined in claim 9, including an additional pump loading conduit (66) and flow dividing valve means (65) connected to the pump and said load signal means (38) for controlling supply of the fluid to the additional pump loading conduit in dependence on the loading of the servomotor.

15. The improvement as defined in claim 9, wherein the pump includes stroke adjusting means connected to the load signal means (38) for varying pump displacement volume.

* * * * *